June 13, 1933.  H. J. WHITE ET AL  1,914,347
BLANK FEEDING MECHANISM FOR GEAR CUTTING MACHINES
Filed Nov. 4, 1930  10 Sheets-Sheet 5
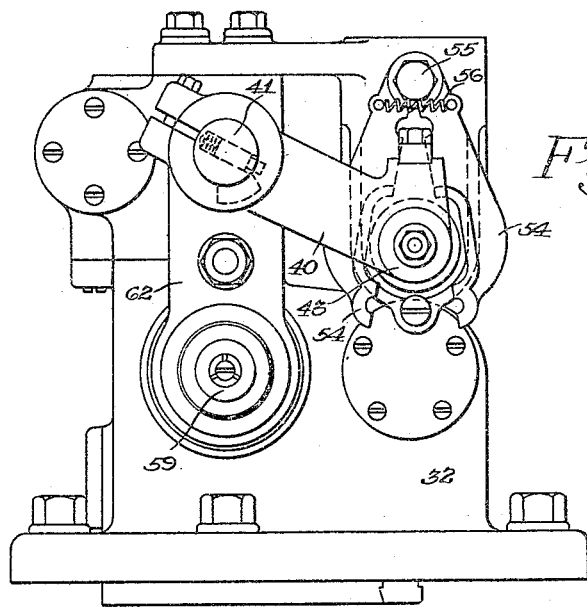
Fig. 20
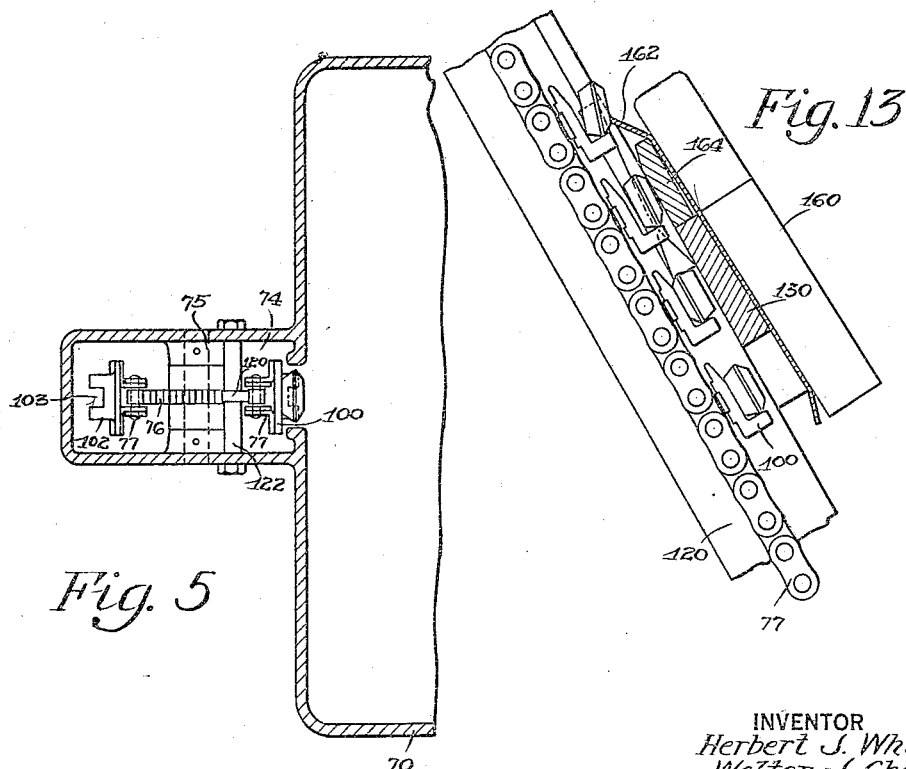
Fig. 13
Fig. 5
INVENTOR
Herbert J. White
Walter J. Charles
BY Schlesinger
their ATTORNEY

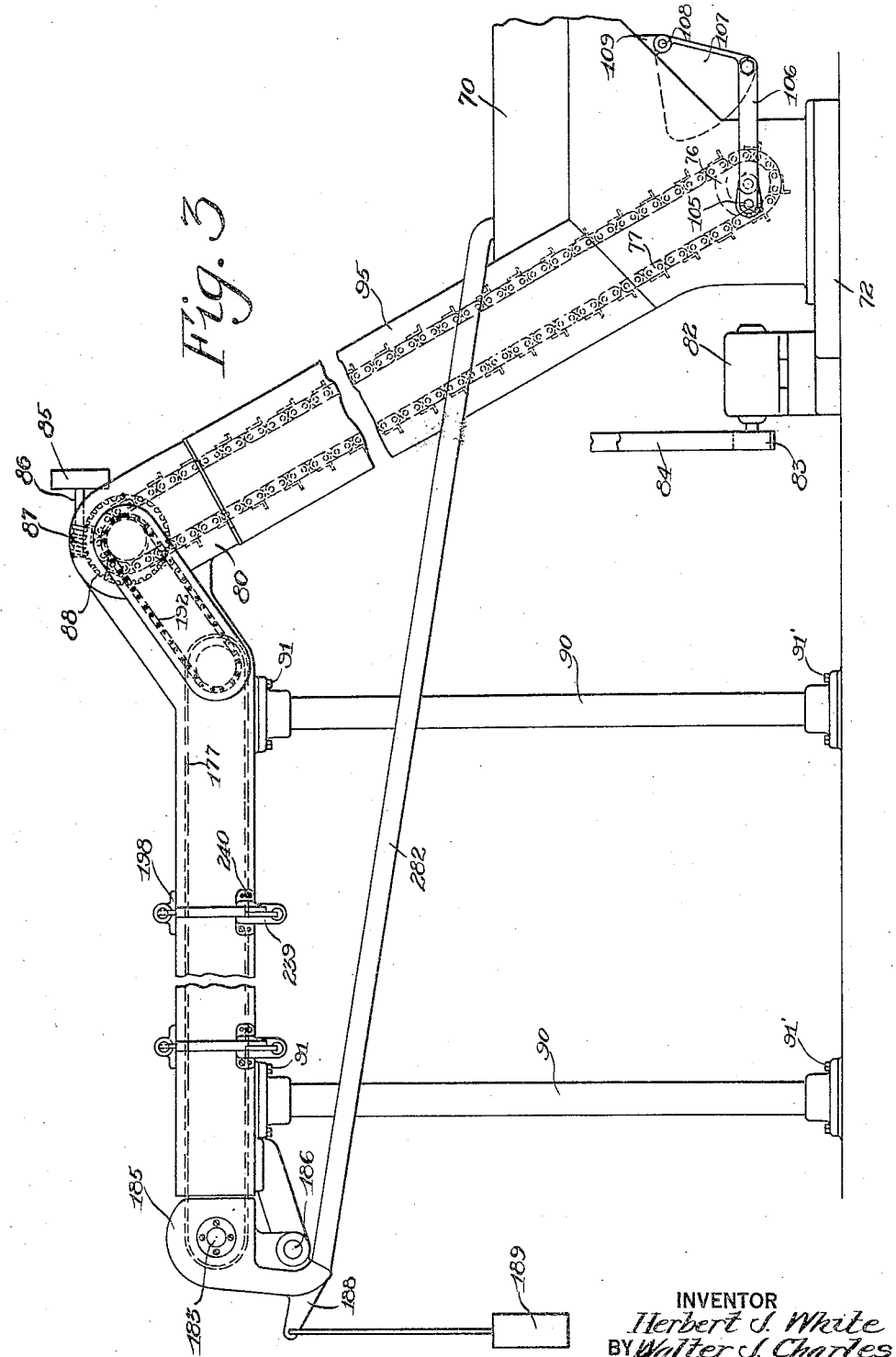

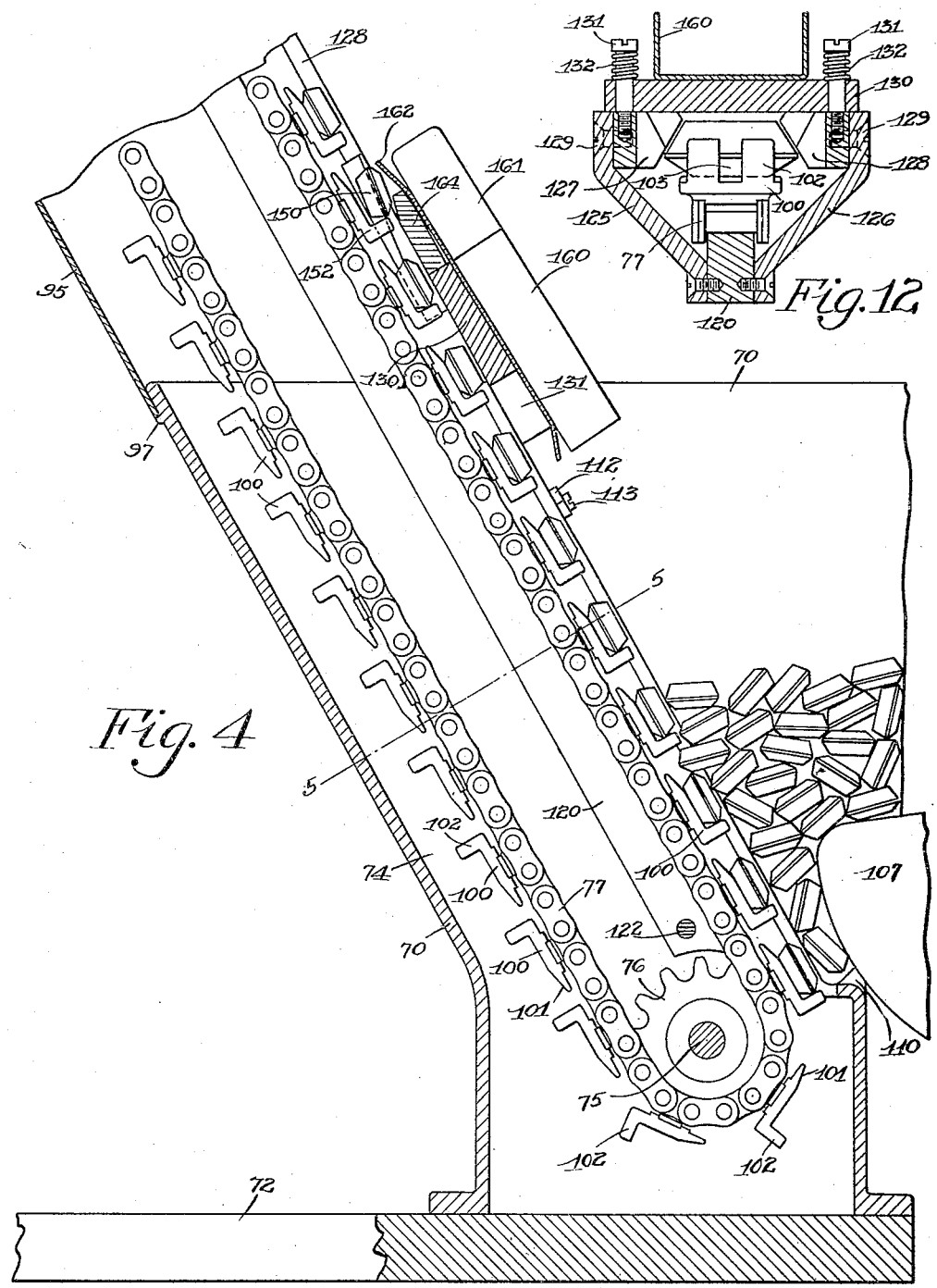

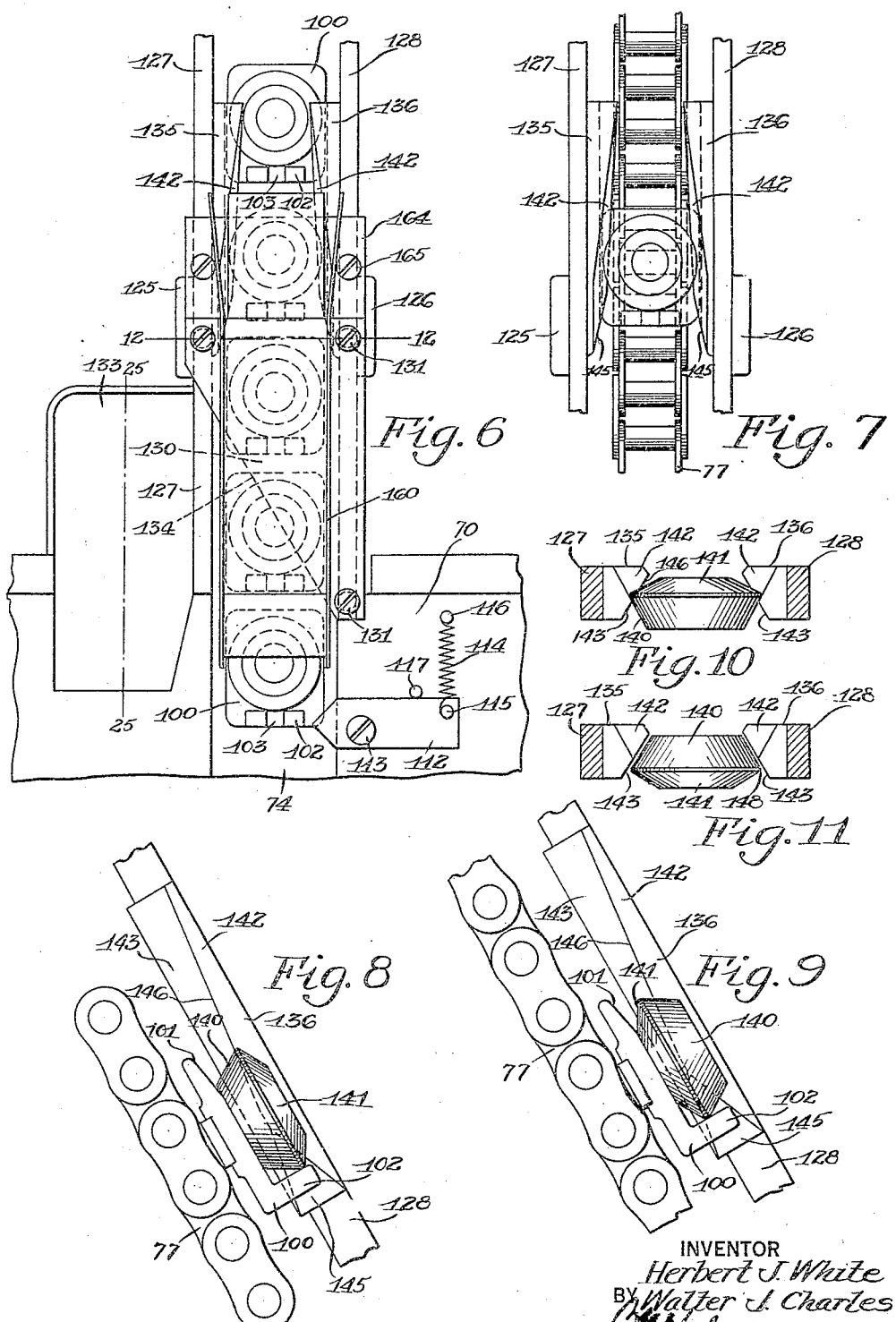

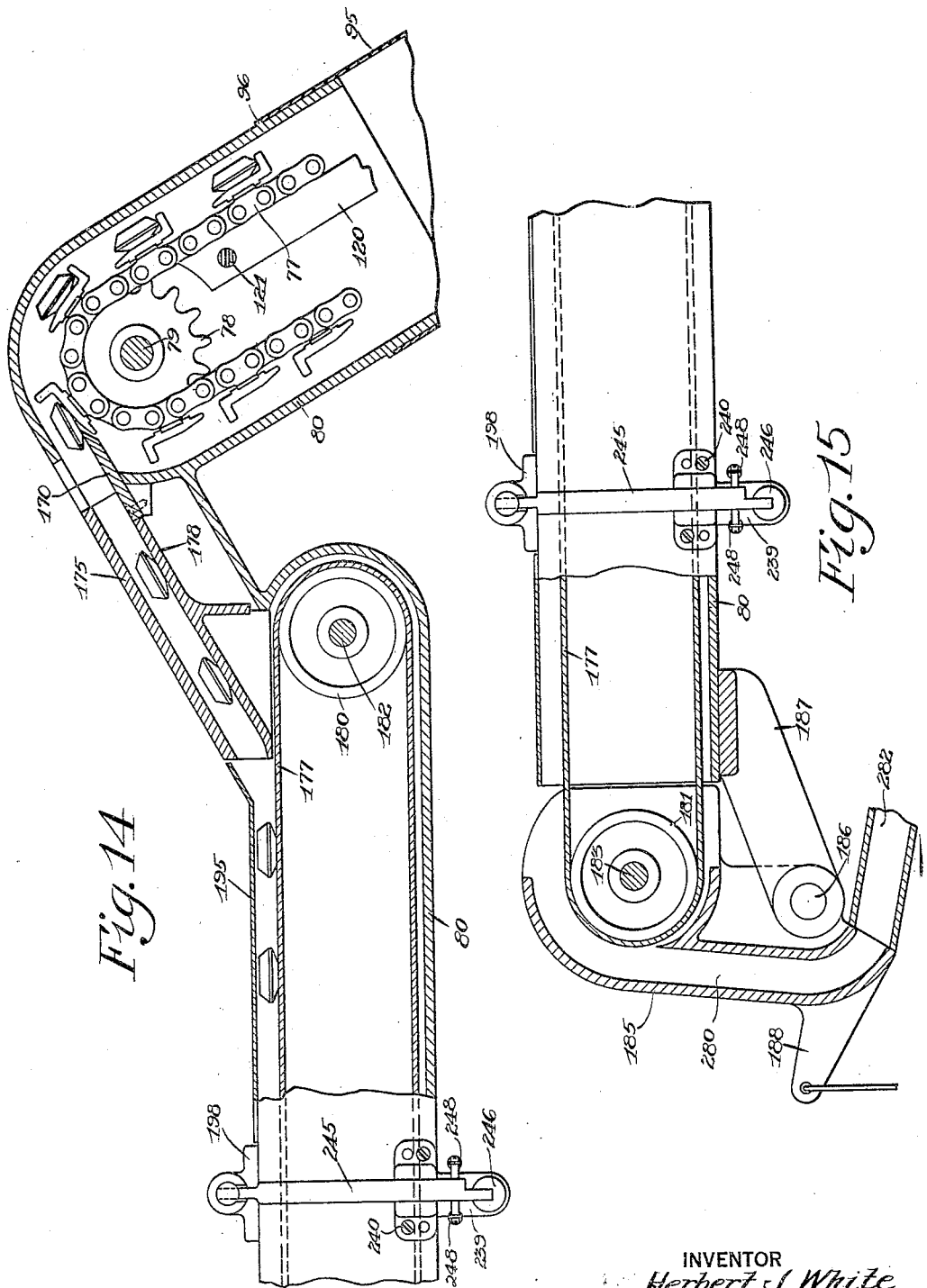

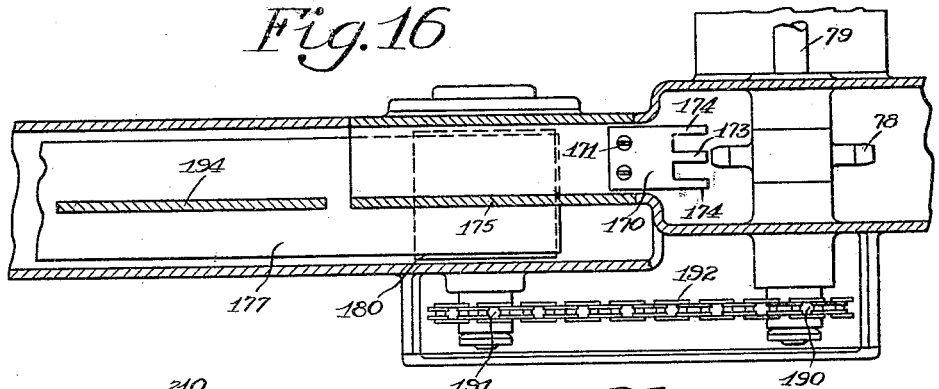

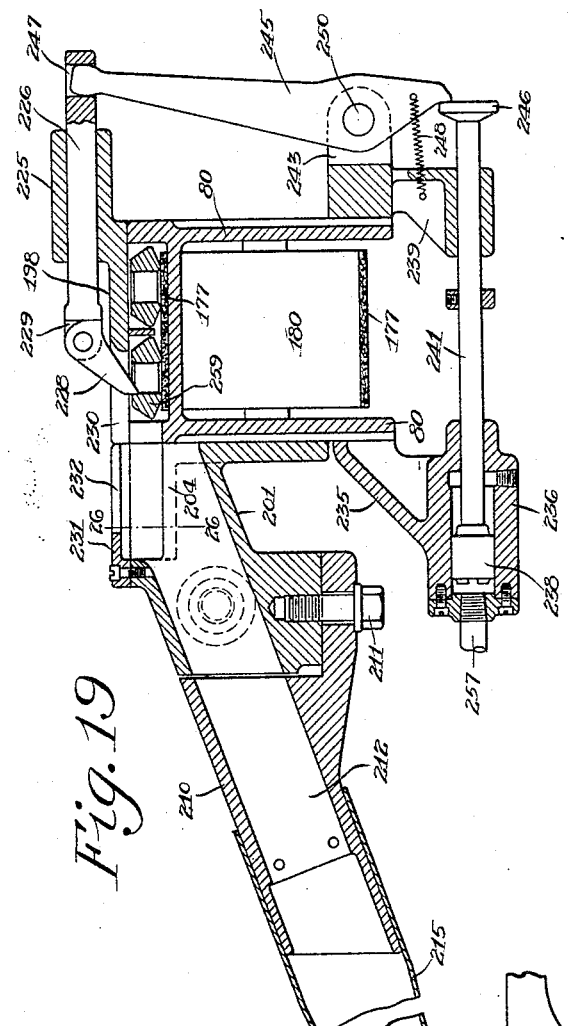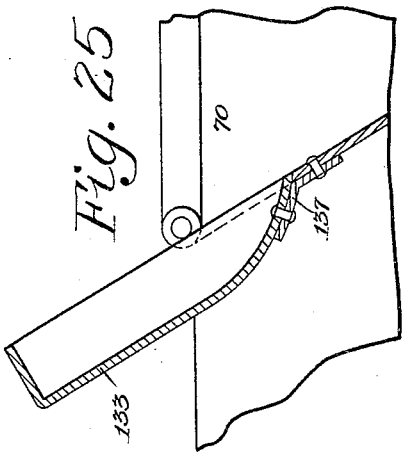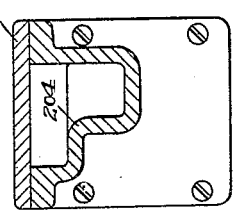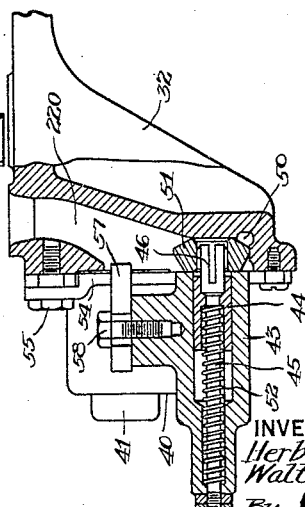

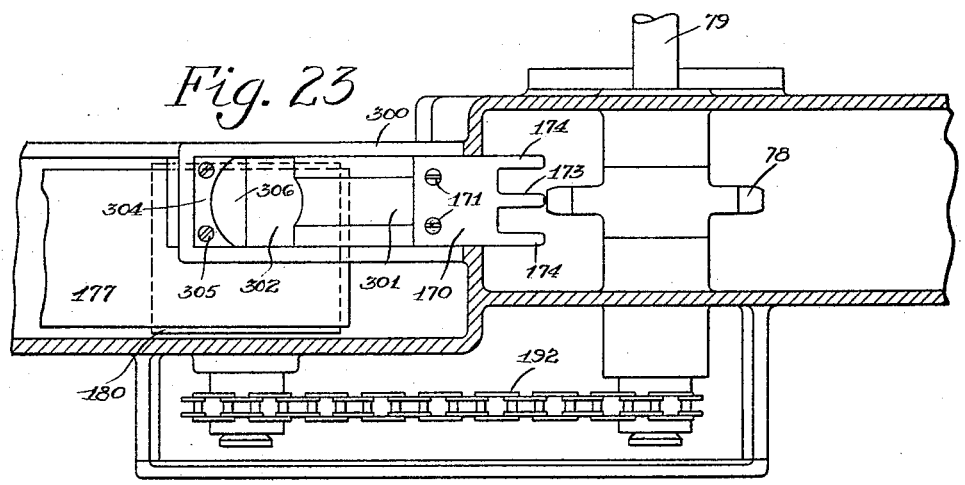
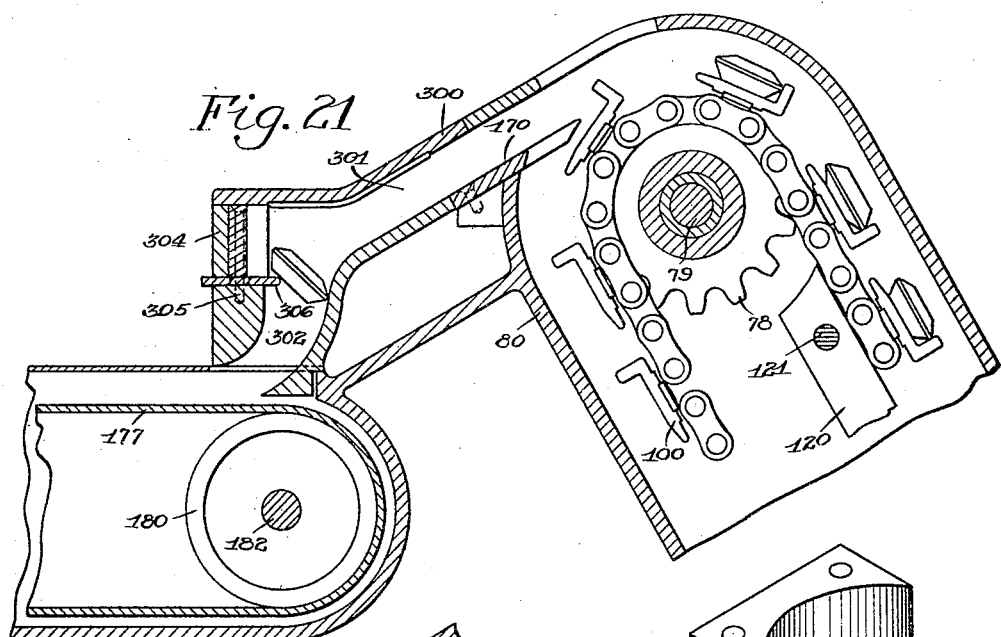
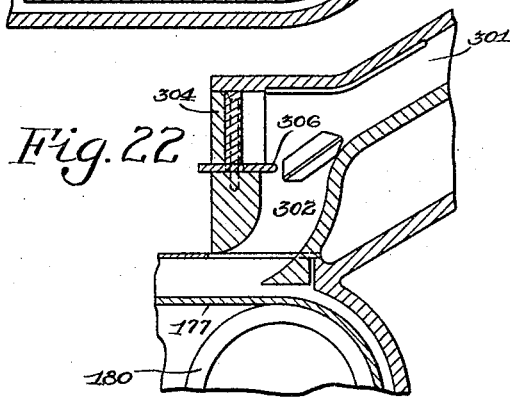
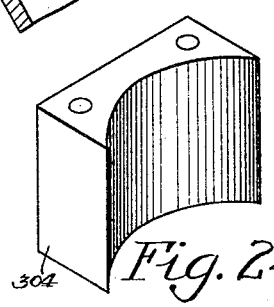

Patented June 13, 1933

1,914,347

UNITED STATES PATENT OFFICE

HERBERT J. WHITE AND WALTER J. CHARLES, OF ROCHESTER, NEW YORK, ASSIGNORS TO GLEASON WORKS, OF ROCHESTER, NEW YORK, A CORPORATION OF NEW YORK

BLANK FEEDING MECHANISM FOR GEAR CUTTING MACHINES

Application filed November 4, 1930. Serial No. 493,317.

The present invention relates to blank-feeding mechanisms and particularly to mechanisms for feeding blanks from a hopper into a machine in which work on the blanks is to be done.

This invention has for its prime purpose the provision of mechanism for feeding gear blanks from a hopper into a gear cutting machine and in a specific aspect, the object of this invention is to provide apparatus for automatically feeding bevel gear blanks from a floor hopper into the bevel gear cutting machine.

A special purpose of the invention is to provide a feeding mechanism which may be employed with the loading mechanism disclosed in the application of Herbert J. White, Serial No. 395,942, filed September 28, 1929 and employed in conjunction with a machine such as illustrated in that application to provide a machine in which the only manual operation required is the infrequent one of dumping blanks into a hopper.

One feature of the present invention is the provision of a selector in the blank-feeding mechanism which will operate to insure that the blanks which reach the machine are in correct position for the machine operation.

A further feature of this invention is the provision of mechanism which permits of supplying several work heads with the blanks from the same hopper.

A still further feature of this invention is the provision of blank-feeding mechanism which is operated by the movement of the work head to loading position to supply one blank at a time to the blank-loading mechanism.

The principal features and objects of the invention are described briefly above. Other objects and other features of this invention will appear hereinafter from the specification and from the recital of the appended claims.

In the drawings:

Figure 3 is a side elevation of one of the blank feeding systems;

Figure 4 is a fragmentary vertical sectional view through parts of this feeding apparatus, the section showing details of the hopper, chain conveyor, and one form of selector;

Figure 5 is a fragmentary sectional view through the hopper, the section being taken on the line 5—5 of Figure 4;

Figure 6 is a fragmentary elevational view showing details of the stripper plate, selector, return chute for blanks and other parts positioned just above the hopper;

Figure 7 is a fragmentary elevational view of certain of the parts shown in Figure 6, the stripper plate, return chute and some of the blank-pockets having been removed for the purpose of clearness in illustration;

Figures 8 and 9 are views taken longitudinally of the conveyor and at right angles to Figure 7, showing, respectively, an inverted blank and a correctly positioned blank being carried through the selector by the conveyor.

Figures 10 and 11 are transverse sections through the selector illustrating, respectively, how it operates to remove an inverted blank from the conveyor and to allow a correctly positioned blank to pass;

Figure 12 is a section on the line 12—12 of Figure 6;

Figure 13 is a detail view showing an inverted blank in the act of being tripped back into the return chute;

Figure 14 is a detail sectional view, showing other parts of the feeding system and in particular the upper end of the elevator chain and the adjoining end of the horizontal conveyor belt;

Figure 15 is a view, partly in section, showing the other end of the conveyor belt and a part of the main return chute;

Figure 16 is a plan sectional view of parts shown in Figure 14;

Figure 17 is a fragmentary plan sectional view taken at another point along the horizontal conveyor, showing the guides and the individual conveyor chutes leading to different work heads of the machine;

Figure 18 is a fragmentary plan view of that part of the system shown in Figure 17;

Figure 19 is a vertical sectional view through the conveyor belt and one of the individual conveyors, showing, also, a portion of the loading mechanism of one of the work heads;

Figure 20 is a front elevation of one of the work heads of the machine and of the parts of the loading mechanism associated therewith;

Figure 21 is a fragmentary sectional view, showing a part of a modified form of feeding mechanism, the section corresponding to that portion of the preferred system shown in Figure 14 and illustrating a modified form of selector and showing how this selector operates to turn over an inverted blank;

Figure 22 is a sectional view corresponding to Figure 21 and showing how a correctly positioned blank passes through the modified form of selector;

Figure 23 is a plan sectional view of the modified form of selector;

Figure 24 is a perspective view of the throat block which forms one part of the modified form of selector.

Figure 25 is a section on the line 25—25 of Figure 6; and

Figure 26 is a section on the line 26—26 of Figure 19.

Figure 1:
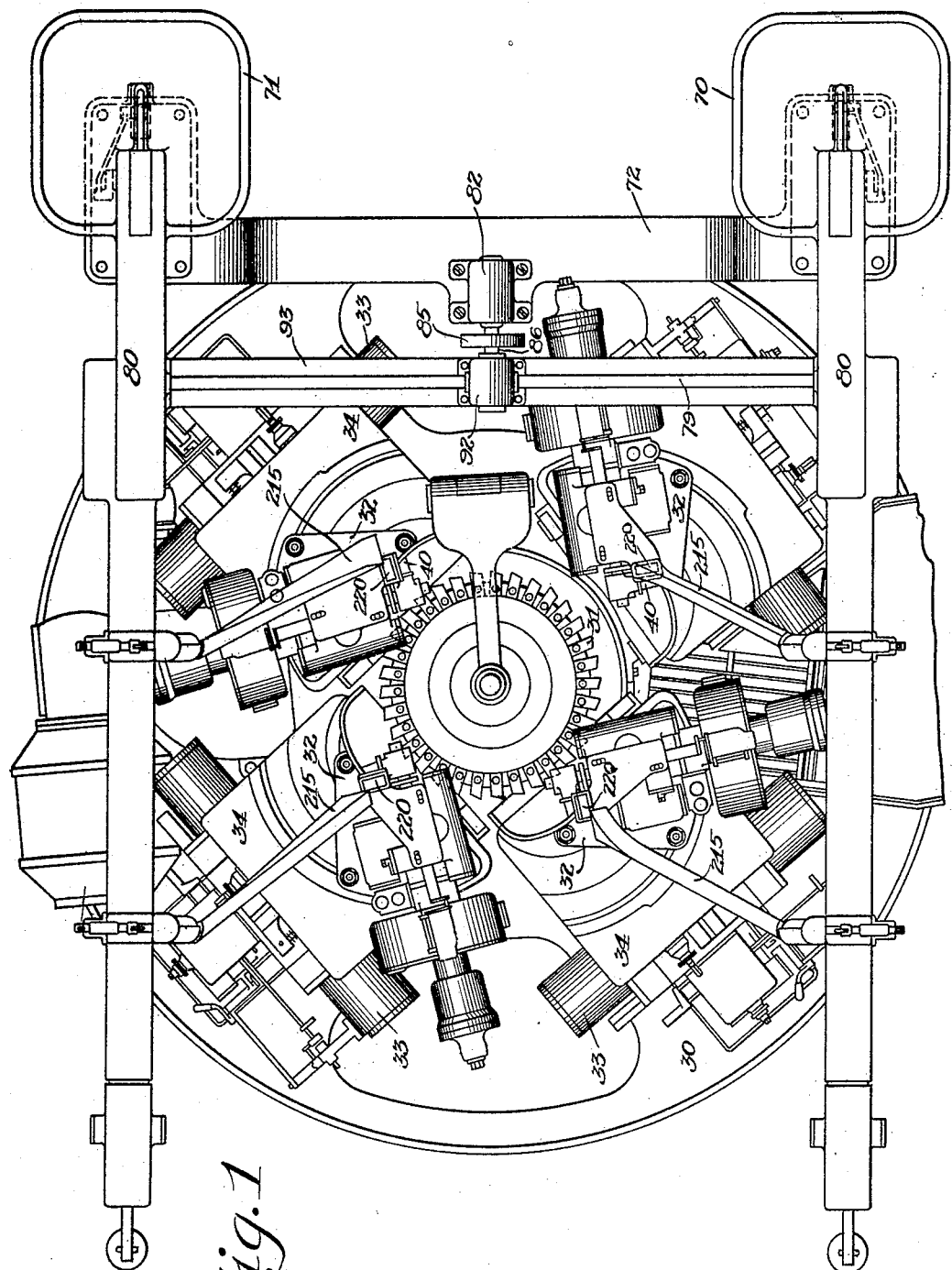
Figure 1 is a plan view of a bevel gear cutting machine of the type described in application No. 395,942 above mentioned, and of a blank feeding mechanism constructed according to the present invention, showing how this feeding mechanism may be employed in conjunction with that type of machine.

In the illustrated embodiment of the present invention, vertically inclined chain conveyors are employed. There are pockets mounted at spaced intervals on each conveyor and these pockets are adapted to hold single gear blanks. Each chain is mounted so that its lower end travels through a hopper containing a mass of gear blanks and as the chain moves, the pockets on the chain pick up gear blanks from the hopper. Mounted just above each hopper are a pair of stripping members which are arranged to strip from the chain and return to the hopper any blanks which get caught sidewise or pile up on one another in the pockets. In one embodiment of my invention, selectors are mounted just above the strippers. These selectors allow only correctly positioned blanks to pass. Inverted blanks are carried away from each chain and a spring member that is associated with each selector flops the inverted blanks back into the corresponding hopper. With this form of selector, only correctly positioned blanks pass on to the loading mechanisms. In a modification of the invention, a selector is used which operates to pass correctly positioned blanks and to turn over inverted blanks and pass them on. With this latter modification of the invention, all blanks which reach the selector are passed and the selector operates to see that they are all right side up when they pass on.

When the pockets reach the upper end of the chains, the blanks are ejected into chutes which carry them onto endless horizontal belts. There are individual chutes or conveyors associated with this belt which are arranged to carry the blanks to the individual work heads of the machine.

The feeding mechanism has been shown in use on a four spindle machine having two work heads on each side of a centrally located cutter and there are two chutes leading from each belt to the individual work heads. Guides are disposed above each belt to guide blanks into the individual chutes and these guides are so constructed that when there is an excess of blanks waiting to pass into one of the individual chutes, other blanks traveling on the belt will be deflected away from that chute and carried on to the next individual chute.

Each work head is provided with an automatic loading mechanism which is arranged to take a gear blank from a pocket in the work head, each time the work head moves to loading position, and chuck this blank on the work spindle. The work head pocket holds only one blank at a time. When a work head moves to loading position after a gear blank has been completed, the pocket in the work head registers with the individual chute corresponding to that work head and a pusher is actuated to shove a blank from the belt down that chute into the pocket of the work head. Thus a new blank will be delivered to the pocket each time the work head moves to loading position and this blank will be picked up by the loading mechanism the next time the work head moves to loading position and will then be chucked on the work spindle.

This in brief describes the operation of the blank feeding mechanism shown in the drawings. It will be understood that the invention is not limited to the particular method and sequence of operations described or to the particular construction shown, but that the invention is capable of various modifications as will be readily understood by those skilled in the art.

Referring now to the drawings by numerals of reference, 30 indicates the base or frame of a four-spindle straight bevel gear rougher constructed substantially as described in the White application No. 395,942 above mentioned. The cutting tool employed on this machine is a rotary milling cutter 31 of large diameter. This cutter is disposed centrally of the machine and around this cutter are arranged at spaced intervals, the four work heads 32. With each work head are associated mechanisms for moving the work heads into cutting position, for withdrawing them intermittently from cutting position to permit indexing of the blank and for indexing the blank, and for moving each work head to loading position, after the blank mounted on the work head has been finished, to allow removal of the completed gear and chucking of a new blank. These several mechanisms form no part of the present invention and need not be described here. Suffice to say, that in the machine illustrated, the movements of each work head for feeding and withdrawal are produced hydraulically by reciprocation of pistons which are mounted respectively in cylinders 33 and which actuate slides 34 on which the work heads 32 are mounted. The speed of movement of each work head carrier 34 is governed by a throttle valve 36 (Fig. 2), and the position of this valve is governed, in each instance, by a pair of cams 37 and 38 which are mounted to travel with the piston that actuates the corresponding carrier 34. Each set of cams 37 and 38 are so constructed and arranged that the corresponding work head has a slow feed movement during the cutting of the tooth spaces of the blank, a faster movement when the head is being withdrawn to index and the throttle valve is full open to allow the work to move at full speed to loading position when the cutting operation on the gear has been completed.

In the machine illustrated, each throttle valve 36 controls, also, the operation of the loading mechanism of the associated work head. When the valve is opened full for the movement of the work head to loading position, it permits supply of fluid pressure to the loading mechanism to actuate the same.

The loading mechanism of the White application can be modified somewhat in construction to conform to the requirements of the present invention as has been illustrated in the drawings of the present application. Essentially, however, this mechanism operates in the same manner as described in the White application. It comprises a transfer arm 40 (Figs. 19 and 20), which is secured to a bar 41 that is oscillatably mounted in the work head 32. The transfer arm 40 is formed at its outer end with an enlarged head 43 which is bored out to receive a block 44 which serves as a guide for the rod 45 to which is secured the spring-collet 46.

Formed in each of the work heads at one side thereof is a pocket 50 which is adapted to hold a single gear blank. The collet 46 of the transfer arm is normally forced out of the bore of the head 43 of the transfer arm by a spring 52 which is housed within the bore of the head and is mounted on the rod 45. When the transfer arm is in the position shown in Figures 19 and 20, the collet 46 is forced by the spring 52 into the bore of the gear blank 51 carried in the pocket 50, gripping that blank. The pocket 50 has its front end open but normally closed by a pair of gate members 54 which are pivotally mounted on a stud 55 threaded into the work head above the pocket 50. The gate members 54 are constantly urged into closed position by a coil-spring 56 which is connected at either end to one of the gate members. The gate members are held open in the position shown in Figures 19 and 20, to allow the collet 46 to engage the gear blank 51, by a member 57 which is secured by the screw 58 to the transfer arm and which has a beveled nose that enters between the gate members and spreads them apart when the transfer arm is moved to the position shown in Figures 19 and 20.

In Figure 20, a gear blank 59 is shown secured to the work spindle of one of the heads 32 in position to be operated upon by the cutter 31. Behind this gear blank, there is mounted the stripper arm 62. When the work head 32 moves to loading position after completion of the gear blank 59, the stripper 62 is actuated to eject the completed gear from the work spindle and the transfer mechanism is then moved to transfer the gear blank 51 from the pocket 50 to the spindle. When this operation is completed, the transfer arm returns to the pocket 50 to engage a new gear blank which will have been carried thereto by the feeding mechanism of the present invention. The transfer and stripping mechanisms are described in detail in the White application above mentioned and form no part of the present invention.

When the blank-feeding mechanism of the present invention is used with the machine of the White application, its purpose is to supply new blanks successively to the several work heads so that the corresponding loading mechanisms and work heads may be kept supplied with blanks so that the operation of cutting gears can go on continuously. We shall now describe the blank-feeding mechanism of the present invention as embodied in a feeding system for a machine such as shown in the White application.

There are four work heads in the White machine and to supply blanks to these work heads, it is preferred to use two feeding systems. One supplies blanks to the two work heads at one side of the machine and the other blanks to the two work heads at the opposite side of the machine. The two feeding systems are identical in construction and operation and only one need be specifically described here. The two hoppers 70 and 71, for the two systems are mounted upon the same base plate 72 which is secured to the floor adjacent one end of the machine. The hoppers are adapted to hold a large quantity of blanks and the operator of the machine can replenish each of them from time to time by shoveling in more blanks.

Each hopper is formed, as clearly shown in Figure 5, to provide a receptacle for blanks and a well 74 which communicates with the blank holding part of the hopper. Journaled in the lower end of the well of each hopper is a stub shaft 75 (Fig. 4) to which is secured a sprocket-wheel 76. Each sprocket-wheel meshes with an inclined elevating chain 77 which moves in the well 74 of the hopper. The upper end of each chain passes over a sprocket-wheel 78 (Figs. 3 and 14) and the chains are driven by these sprocket-wheels 78.

The sprocket-wheels 78 are mounted upon the same drive shaft 79 (Fig. 1). The shaft 79 is journaled at its two ends in castings 80 which are of identical construction and which form part, respectively, of the two feed systems.

The shaft 79 is driven continuously during the operation of the machine by a motor 82 (Figs. 1 and 3) which is mounted upon the base plate 72. This motor is operatively connected with the shaft 79 by the pulley 83, the belt 84, the pulley 85, the worm-shaft 86 on which this pulley 85 is mounted, the worm 87 and the worm-wheel 88 which is secured to the shaft 79.

Each of the two castings 80 is mounted upon a pair of supporting posts or columns 90, the castings being bolted to the heads of the columns 90 by bolts 91 (Fig. 3) and the bases of the columns being bolted to the floor by bolts 91'. The housing 92 for the worm 87 and worm-wheel 88 is secured to a bar 93 (Fig. 1) which is connected at its ends to the two castings 80 and which serves as a brace for the whole super-structure of the two blank-feeding systems.

A sheet-metal guard 95 is secured between each casting 80 and the corresponding hopper 70 or 71, as the case may be. The guards 95 abut at their upper ends against the shoulders 96 formed on the castings 80 (Fig. 14) and at their lower ends against the shoulders 97 formed on the hoppers (Fig. 4).

To every third link of the chains 77 there is secured a blank holder or pocket 100. These pockets are simply shelves, beveled off at their forward ends as indicated at 101, and formed with backs 102. The backs of the pockets are notched, as indicated at 103 in Figures 5, 6 and 12 for a purpose which will hereinafter appear.

As the chains move, the pockets 100 on the upper side of each chain pick up blanks out of the mass of blanks in the corresponding hoppers and carry them along with the chain. To enable this to be done and done with a minimum of power, the blanks in each hopper are kept constantly agitated. Thus, to the outer end of each of the stub shafts 75 there is connected a crank-arm 105 (Figs. 1 and 3). Each crank-arm 105 is pivotally connected to a link 106 which in turn is pivotally connected to an agitator plate or arm 107. Each arm 107 is pivotally mounted by means of a pin 108 on an ear 109 which is cast integral with the corresponding hopper. The under wall of each hopper is slotted as indicated at 110 to allow the associated agitator plate or arm to pass there-through and freely oscillate. As each chain 77 moves it rotates the corresponding sprocket 76 and the sprocket in turn drives the associated agitator 107 through the mechanism just described.

Naturally not all the blanks will go into the pockets 100 in the correct position. Sometimes two or more blanks may become wedged alongside one another in a pocket or piled up on top of one another and sometimes individual blanks instead of being picked up right-side-up will be picked up in inverted position. The gear cutting machine shown is for cutting bevel gears. Now the teeth are cut into the front cone surface only of a bevel or hypoid gear blank and it is very important, therefore, to see not only that the blanks picked up by the chains are seated completely in the pockets of the chains but also that they are right-side-up for they must be delivered to the loading mechanism right-side-up. Means has been provided to take care of all these contingencies and to insure that only correctly positioned blanks travel on to the machine.

Mounted in each hopper just above the mass of blanks is a stripping finger 112 (Figs. 4 and 6). This finger is pivotally mounted upon a stud 113 which is screwed into the back wall of the hopper. The end of each finger projects over the well 74 formed in the associated hopper casting and into the line of travel of the blanks on the conveyor chain. The fingers function to strip extra blanks from the pockets of the chains as the pockets travel upwardly and to straighten up the single blanks in the pockets. The fingers 112 are held yieldably in position at right angles to the path of travel of the corresponding chains by coil-springs 114, each of which is secured at one end to a pin 115 that is fixed to the finger 112 and at its opposite end to a pin 116 that is secured in the associated hopper. Pins 117 secured in each hopper serve to limit the movement of the fingers 112 in one direction.

To support each elevator chain and prevent it from sagging, a bar 120 is provided. One bar is shown in Figures 4, 5, 12 and 14. Each bar is held in position by bolts 121 and 122 extending through the sides of the corresponding casting 80 and the sides of the corresponding hopper 70 or 71, respectively. The rollers of the chains 77 travel on the faces of these bars 120 and the links of the chains extend over the sides of these bars so that each bar serves simultaneously to support a chain and hold it against sidewise movement.

Secured to each bar 120 just above the corresponding hopper is a pair of brackets 125 and 126, (Figures 7 and 12). These brackets extend on either side of the corresponding chain. The brackets serve to support, respectively, the side bars 127 and 128 which are secured in position on the brackets by screws 129.

There is a stripper plate 130 resiliently mounted on each pair of these bars 127 and 128. Each of the stripper plates 130 is held in position by springs 132 which are interposed between the stripper plate and the heads of screws 131 that thread into the bars 127 and 128 (Figs. 6 and 12). Each stripper plate overlies the corresponding chain 77 with its lower face extending just above the path of travel of blanks which are seated in the pockets 100 of the chain. The lower or entering face 134 of the plate 130 extends diagonally across the line of travel of blanks on the chain and acts as a wiper (Figs. 4 and 6.) Extra blanks carried by the chain up to this point are wiped off the chain by the plate 130 into a chute 133 (Fig. 6) which carries them back into the hopper. The chute 133 is secured to the rear wall of the hopper by brackets 137 (Fig. 25).

In one embodiment of the invention, there is a selector mounted just beyond the stripper plate 130. The function of this selector is to remove inverted blanks from the pockets of the chain so that only correctly positioned blanks go on to the machine. This selector comprises a pair of bars 135 and 136 (Figs. 6 to 12 inclusive). One of the bars, 135, is secured in any suitable manner to the side rail 127 and the other bar 136 is secured in any suitable manner to the side rail 128.

The feeding mechanism may be used for feeding various sizes and shapes of blanks to the cutting machine. For the purpose of illustration, we have shown the mechanism in use feeding bevel gear blanks as the type commonly used for the pinions of the differentials of automobile rear axles. These blanks are shaped so that the face cone surface 140 (Figs. 10 and 11) is wider than the back cone surface 141 and so that the two cone surfaces have different cone angles. In the blank shown, the cone angle of the back cone surface 141 is considerably larger than the cone angle of the front cone surface 140.

The opposed faces of each of the bars 135 and 136 are composed of an upper surface 142 and a lower surface 143. The entering portions 145 of the opposed faces of the bars 135 and 136 are beveled off. The surfaces 142 and 143 of each bar intersect in a line 146 and these surfaces are so formed that the lines 146 of the two bars comprising a selector converge toward each other in the direction of movement of the blanks and diverge away from the plane of travel of the associated chain. The surfaces 143 of the bars 135 and 136 are so inclined to each other and so spaced apart that they will permit a blank which is correctly positioned in a pocket 100 to pass on upwardly in the travel of the chain, as indicated clearly in Figures 9 and 11. The entering portions of the surfaces 142 of the two bars extend down, however, to a point where, if the blank carried in the pocket 100 is inverted, as shown in Figures 8 and 10, the ridge formed by the intersection of the two faces 142 and 143 and designated by the line 146 will engage under the crown 148 of the blank. Thus the inverted blank will be caught by the selector. As the pocket 100 in which it was seated travels upwardly, this inverted blank will be pushed by the back 102 of the seat along the ridge 146 and since the ridge 146 diverges away from the plane of travel of the pocket, the blank will be carried on up and lifted entirely out of the pocket.

Secured to each stripper plate 130 is a U-shaped trough 160 made of sheet metal. The sides 161 of these troughs are slit away from their bottoms 162 at one end as shown in Figures 4 and 6 and the free ends of the sides are bent outwardly and the bottoms of the troughs bent downwardly. The downwardly bent portions 162 of each trough, operate as spring flippers to flip inverted blanks which are carried out of the pockets by the associated selector back into the trough 160 so that they will return to the hopper. Figure 4 shows an inverted blank 150 being carried out of a pocket of the elevator chain and Figure 13 shows this blank a moment later about to be flipped by a spring-piece 162 into the trough 160.

To hold an inverted blank on the ways 146 formed by the convergence of the surfaces 142 and 143 of the selector bars 135 and 136 until it has fully cleared the pocket in which it has been seated, there is a bar 164 (Figs. 4 and 6) provided. Each bar 164 is secured by screws 165 to the associated bars 127 and 128 above the corresponding stripper plate 130. The leaving ends of the bars 164 are beveled as clearly shown in Figure 4 to permit free movement of the inverted blanks along the ridges 146.

The selector described operates to insure that only blanks which are right-side-up pass on to the machine. It will be understood, of course, that the shape of the selector bars 135 and 136 and the distance these bars are spaced apart will depend upon the shape of the blanks to be fed and that the invention is not limited to the particular embodiment shown.

The correctly positioned blanks are carried on upwardly by the elevator chains. The blanks carried by each chain are stripped from the pockets by a stripper member 170 (Figs. 14 and 16) as the pockets are carried successively over the corresponding drive sprocket 78. Each stripper 170 is secured to the casting 80 by screws 171. Each stripper plate 170 is formed with three prongs at its entering end. One of these prongs 173 passes through the notches 103 in the back 102 of the pockets 100 and the other two prongs 174 pass on either side of the backs 102 as each pocket rocks over the high point of the sprocket 78. The construction of the stripper plate permits of bringing the plate very close to the pockets, thereby eliminating any possibility of jamming of a gear blank between a pocket and a stripper plate.

Secured to each casting 80 in any suitable manner is a hollow casting 175 that serves as a chute for carrying the blanks from the stripper plate 170 onto an endless belt 177. The inside bottom wall 178 of each casting 175 is in line with the upper side of the associated stripper plate 170 and the upper face of the stripper plate forms, hence, an extension of the slideway of the chute 175.

Each belt 177 runs on pulleys 180 and 181 (Figs. 3, 14, 15 and 16). Each pulley 180 is secured to a shaft 182 which is journaled in one of the castings 80. Each of the pulleys 181 is secured to a shaft 183 that is journaled in a swinging casting 185. The castings 185 swing on pins 186 which are mounted in brackets 187 that are secured to the associated castings 80. There is an arm 188 cast integral with each casting 185 and a weight 189 is swung from each of these arms. The weights tend to swing the castings 185 about their pivots 186 maintaining the belts 177 taut.

The belts 177 are driven continuously during the operation of the feeding mechanisms from the shaft 79 (Fig. 16). The drive is from a sprocket 190, which is secured on one end of the shaft 79, to a sprocket 191, which is secured on one end of the pulley shaft 182, the two sprockets being connected by a chain 192.

As the blanks move out of the chutes 175 onto the belts 177, they are guided to one side of each belt by a guide-bar 194 (Figs. 16 and 17). Each guide-bar is secured to a cover-plate 195 (Fig. 14) that serves to cover part of the associated trough-shaped casting 80. Each guide 194 is in line with the inner side wall of the associated chute-casting 175 as clearly shown in Figure 16.

Each guide 194 directs the blanks, as they are carried by the associated belt 177, into an angular guide-piece 196 which is secured by screws 197 to a cast cover-plate 198 that covers a portion of the length of the belt and is secured by screws 199 to the casting 80 (Fig. 18).

Secured by screws 200 to one side of each casting 80 is a small casting 201. The side wall of each casting 80 is cut away, as indicated at 202 in Figure 17 and the opening is of sufficient size to allow single blanks to pass from the associated guide 196 into the associated casting 201. The casting 201 is shaped to provide a passageway for the blanks. The entrance of this passageway, as clearly seen in Figure 17, is wide enough to allow passage of a blank moving in a horizontal plane but the passageway is gradually restricted in width until it will only allow movement of the blank when rolling on its side, that is, when moving in a vertical plane. There is a shelf 204 (Figs. 17, 18 and 26) formed on the casting 201 which extends into the passageway in a horizontal plane and over about half the width of the passage at the entrance to the passage.

When a blank is moved into a casting 201, it is in horizontal position. The shelf 204 supports it initially in this position, but since the width of the passageway 203 is gradually restricted due to the shape of the side wall 205 of the casting 201, the blank is quickly tilted onto its side. The edge of the shelf serves as a fulcrum for the tilting movement. By means of the shelf and the retricted passageway, then, each blank entering the casting 201 is tilted from horizontal position into vertical position. A blank is shown being tilted in Figure 17 and in the vertical position into which it is tilted in Figure 19.

210 designates a casting which is secured by bolts 211 (Fig. 19) to the casting 201. Each casting 210 is formed with a narrow vertical passageway 212 which aligns with the vertical portion of the passageway 203 in the associated casting 201. A sheet-metal chute 215 is riveted to each of the castings 210. The chutes 215 are shaped to form continuations of the downwardly inclined narrow, vertical passageways formed in the associated castings 201 and 210.

Each work head 32 is formed with a passageway 220 (Figs. 1 and 19) that leads into the pocket 50 of the work head. There is a chute 201—210—215 provided for each work head as will hereinafter appear. When a work head is moved to loading position, the passageway 220 registers with the mouth of the chute 215 and a blank rolling down the chute 215 is delivered into the passageway 220. The passageway 220 is so shaped that the blank is held in its vertical position and delivered into the pocket 50 of the work head 32 with the right side forward in the correct position to be picked up by the transfer arm 43 in the ensuing operation of that arm.

In the gear cutting machine illustrated, when a work head moves to loading position, the transfer mechanism is actuated to carry a blank from the pocket 50 to the work spindle so that the same may be chucked to allow of its being cut when the work head is returned into operative relation with the cutter. The function of the blank-feeding mechanism of the present invention when used in conjunction with a machine of the type illustrated, is to supply a blank to the pocket 50 each time that a work head moves to loading position so that a constant supply of blanks is fed into the machine so that its operation may be continuous.

The mechanism for moving blanks from the belts 177 into the chutes formed by the several castings 201 and 210 and the sheet-metal parts 215 will now be described.

Each cover-plate 198 is formed with a cylindrical guide portion 225 which is bored to serve as a guide for a reciprocable plunger 226 (Figs. 18 and 19). The plunger 226 carries a pawl 228 at its forward end which is pivotally mounted between ears 229 formed on the plunger. Each pawl 228 operates in a slot 230 cut in the associated cover-plate 198 and is adapted to engage in the bore of that gear blank which at the moment is in the guide 196 and in alignment with the opening 202 through the side of the associated casting 80. The cover-plate 231 of the casting 201 (Fig. 19) is slotted at 232 in alignment with the slot 230 to allow of reciprocation of the pawl 228 for the full length of its stroke.

The plunger 226 and pawl 228 are reciprocated by fluid-pressure. There are castings 235 (Fig. 19) which are secured to one side of the castings 80 and each casting 235 is formed to provide a cylinder 236. A piston 238 reciprocates in each cylinder 236. To the opposite side of the casting 80, castings 239 are secured by screws 240 (Figs. 3, 14, 15 and 19). These castings are bored to form guides for the piston rods 241 of the pistons 238.

Each casting 239 is formed with ears 243 and between these ears there is pivotally mounted a double arm lever 245. The lower arm of this lever is engaged by the head 246 of the piston rod 241, while the upper end of the lever 245 engages in a slot 247 in the plunger 226. A coil-spring 248 is secured at one end to the lower arm of the lever 245 and at its other end to the casting 239. This spring serves to rock the lever arm 245 about its pivot pin 250 to hold the plunger 226 in its withdrawn or inoperative position.

When the work head moves to loading position the valve 36 (Fig. 2) is allowed to rise and pressure fluid is supplied by the pump in the machine through the ports 252, the groove 253 and the ports 254 to a line 255. One branch 256 of this line goes to the transfer mechanism to operate the same. The other branch 257 goes to the cylinder 236 to supply pressure fluid to the piston 238. When the loading mechanism is actuated, the gear blank which has just been completed is stripped from the work spindle and a new gear blank 51 (Fig. 19) is taken from the pocket 50 of the work head and chucked on the spindle. While the loading operation is going on, the pressure fluid flowing to the cylinder 236 moves the piston 238 against the resistance of the spring 248, rocking the lever arm 245 about its pivot 250, and moving the plunger 226 and pawl 228 forward. This carries the blank with which the pawl 228 has been engaged, such as the blank 259 (Fig. 19), from the guide 196 into the casting 201. This blank is turned on its side in the casting 201 and rolls down the chute formed by the castings 201 and 210 and the sheet-metal part 215 into the pocket 220 which is now in registry with the mouth of the sheet-metal chute 215. Thus a new blank is delivered into the pocket 50. When the loading operation has been completed and the work head is returning to working position, this blank will be engaged by the collet 46 of the transfer-arm, which will have returned into the pocket 50, so that on the subsequent movement of the work head to loading position, this new blank 259 may be transferred to the work spindle.

Figure 2:
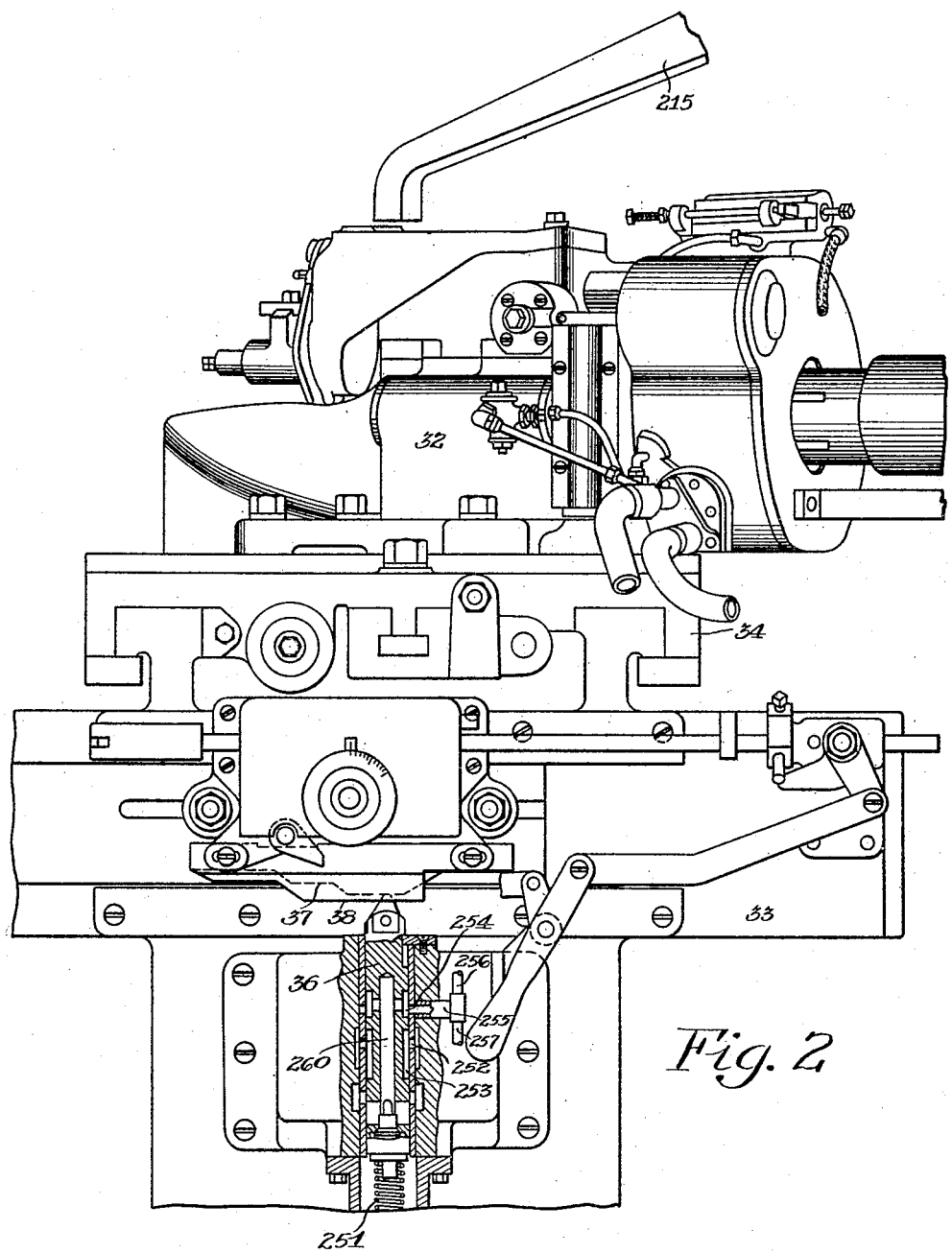
Figure 2 is a partial side elevation of one of the work head units of the machine of Figure 1.

As the work head returns to loading position, the valve 36 (Fig. 2) is depressed to the position shown in Figure 2 and the line 257 exhausts through the line 255 and the ports 254 into the bore 260 of the valve whence the fluid flows back to the sump of the machine. The plunger 226 and the pawl 228 are then returned to the position shown in Figure 19 by operation of the spring 248 and at the same time by operation of this same spring the piston 238 is moved to the left in the cylinder 236 to the position shown in Figure 19 forcing the pressure fluid out of the cylinder.

As soon as the blank 259 has moved out of the guide 196 by the actuation of the pawl 228, as described, the blank 261 (Fig. 17) will be moved by operation of the running belt 177, up in the guide 196 into a position of registry with the opening 202 in the side wall of the casting 80 and another blank will be moved by the belt into the position formerly occupied by the blank 261. As the pawl 228 moves back to the position shown in Figure 19 under operation of the spring 248 with the cylinder 236 on exhaust, the pawl ratchets over the edge of the blank 261 and drops into the bore of this blank, occupying the same position with reference to the blank 261 as it formerly occupied with reference to the blank 259. Thus, the pawl is in position to feed the blank 261 into the chute 201 the next time that the work head moves to loading position.

To insure that there will always be a sufficient supply of blanks at the chute leading to each work head, the elevator chains 77 and belts 177 are driven at a speed which will normally bring an excess of blanks to the guides 196. Each guide 196 is shaped to hold two or more blanks. If a guide is full, other blanks will be deflected away from the guide and the entering end of the wall of the guide is beveled off as indicated at 270 in Figure 17 to assist in deflecting excessive blanks away from the guide. Figure 17 shows a blank 271 being deflected away from the guide. The excess blanks are carried on by the running belt 177. If the machine were a single-spindle machine, the excess blanks would be returned to the hopper by a convenient chute. In the case of the multiple-spindle machine shown in the drawings, the excess blanks are carried on by the belt 177 to a diagonally arranged guide 273 which is secured to a sheet-metal cover-plate 274 that serves to cover a part of the length of the casting 80.

The guide 273 deflects the blanks traveling on the belt into line with a guide 275 which is of the same shape as the guide 196. The guide 275 is secured to a cover 198 like the cover 198 already described. The guide 275 serves to position blanks so that they can be moved into a chute 201—210—215 that carries them to another work head of the machine on the same side of the machine as the work head served by the guide 196. The chute leading to this second work head is of the same construction as the chute leading to the first work head and the means for forcing the blanks into this second chute are identical in construction and operation with the means already described for forcing the blanks into the chute for the first work head. It is not necessary to repeat the description of these parts here but for the sake of reference, identical parts are numbered alike in the drawings.

When the guide 275 is filled with blanks, other blanks are deflected away and are carried on by the belt 177 into the chute 280 (Fig. 15) formed in the casting 185. This chute 280 leads into a sheet-metal chute 282 which returns to the hopper as clearly shown in Figure 3.

When the modified form of selector shown in Figures 22 to 24 inclusive is employed, the chute 160 and selector bars 135 and 136 (Figs. 6 and 12) are eliminated. The blanks which pass by the stripper finger 112 and the stripper plate 130 are carried on upwardly by the conveyor 77 into a casting 300 which takes the place of the casting 175 of Figure 14. The blanks are stripped, as before, from the pockets 100 by the stripper plate 170. The casting 300 is formed with a sharp downwardly inclined passage 301 that has a rounded bottom. This leads into a passage 302 which is curved sharply at an angle to the passage 301 and from which the blanks drop onto the belt 177. At one side of the throat formed by the juncture of the passage 301 with the passage 302 there is secured a throat block 304. This is secured in place by screws 305. Beneath this block 304 and secured in position by the same screws 305 is a throat plate 306.

The inner edge of the throat-plate 306 projects into the passageway 302 slightly beyond the inner face of the block 304. The face of this block 304 is concaved while the edge of the plate 306 is straight but rounded. When a blank that is right side up slides down the passage 301 its narrow, rounded back-cone surface, follows the line of the bottom walls of the passage 301 and it drops into the passage 302 without being turned over as indicated in Figure 22. When an inverted blank slides down the passage 301, however, it will not pass through the restricted throat formed by the plate 306 in inverted position, but will fulcrum on the rounded edge of the throat plate, be turned over and drop into the passage 302 in correct right side up position. The concave face of the throat block 304 allows the inverted blank to project over the plate 306 as shown in Figure 21 and gravity does the rest. The blank is turned over and passes on down the passage 302 in correct position.

When the selector shown in Figures 21 to 24 inclusive is used, all of the blanks coming to the selector will be passed on to the belt 177 and passed on right-side-up. This is in contrast to the operation of the selector formed by the bars 135 and 136 which returns inverted blanks to the hoppers and operates to pass only blanks which are already right-side-up. The type of selector shown in Figures 6–12 inclusive is capable of more universal use since it can be employed with any type of gear blank by simply using suitably shaped and suitably spaced bars 135 and 136. The type of selector shown in Figures 21 to 24 inclusive is more restricted in its use and the plate 306 must be delicately adjusted for the particular blanks being fed. For its particular field, however, this selector is quite satisfactory.

The movement of the blanks after they reach the belt 177 is the same when the selector of Figures 21 to 24 inclusive is used as when the selector bars 135 and 136 are used and need not here be retold.

The complete operation of the blank feeding mechanism when applied to a four-spindle machine of the type shown in the drawings can now be described. There are two hoppers 70 and 71. An elevator chain 77 passes through the mass of blanks in each of the hoppers. The two elevator chains are driven from a motor 82 through the pulley 83, the belt 84, the pulley 85, the worm-shaft 86, the worm 87, the worm-wheel 88 and the shaft 79 to which the worm wheel is secured. Sprocket wheels 78 are secured to the two ends of the shaft 79 and these sprocket wheels drive the elevator chains 77. There are a plurality of pockets 100 carried by the links of each elevator chain 77. As the pockets of each chain travel upwardly, they pick up blanks out of the mass of blanks in the two hoppers and as the pockets pass under the stripper finger 112 and the stripper plate 130 associated with each chain, excess or cocked blanks are wiped or stripped out of the pockets and returned to the hoppers. Blanks which are right side up in their pockets pass through the selector bars 135 and 136 (Figs. 10 and 11), where this type of selector is used, but inverted blanks are caught on the ridges 146 formed by the conjunction of the faces 142 and 143 of these bars and are carried up out of the pockets of the chain as the chain travels upwardly. When these inverted blanks have cleared their pockets, they are flipped backwardly into the associated chute 160 by the spring 162 (Figs. 4 and 13) formed by bending down the bottom of the chute. They slide down the chute back into the hopper 70 or 71 as the case may be.

The blanks that remain in the pockets are carried on upwardly by the chain into the chute 175 (Fig. 14), being stripped from the pockets of the chain by the stripper 170. The blanks then slide down the chute 175 onto the belt 177 which is being driven continuously from the shaft 79 through the sprocket 190, chain 192, sprocket 191 and pulley 180 (Fig. 16). The moving belts 177 of each feed system carry the blanks first of all into a guide 196. Excess blanks are carried on by the belt to the guide 273 which deflects them into a second guide 275. Excess blanks at the second guide are deflected away and carried on by each belt into the chute 280 of the casting 185 (Fig. 15) and they return through the chute 282 to their respective hoppers 70 or 71.

When one of the work heads moves to loading position after the completion of the cutting operation on a blank, the valve 36 (Fig. 2) is moved by the spring 251 to a position where it puts the line 255 on supply. Pressure fluid is supplied to the mechanism for actuating the transfer arm 46 and this is moved away from the pocket 50 in the work head carrying with it the blank which was previously positioned in that pocket. The movement of the transfer arm may be employed to actuate the stripper 46 (Fig. 20) to eject the previously completed gear blank from the work spindle, as in the machine of the White application above mentioned. The transfer arm 40 carries the new blank from the pocket 50 to the work spindle and it is chucked. The transfer arm is then moved back to alignment with the pocket 50.

At the time that the line 256 is put on supply, the line 257 is put on supply also. This causes the motive fluid to be supplied to the cylinder 236 to move the piston 238 to the right against the resistance of the spring 248 (Fig. 19). Thus, the lever 245 is rocked about its pivot 250 to move the pusher rod 226 and the pawl 228 forward, shoving a blank out of a guide 196 or a guide 275, as the case may be, into the associated casting 201. The narrowing of the passageway in the casting 201 causes the blank to be tipped over from horizontal to vertical position, the shelf 204 serving as a fulcrum for this movement.

The blank then rolls down the chute formed by the castings 201, and 210 and the sheet metal chute 215, into the passageway 220 which, in the withdrawn position of the work head, is in register with the mouth of the chute 215. Thus, a new blank is dropped into the pocket 50 so that when the transfer arm 40 will have returned from loading position, the collet 46 of the transfer arm will engage this blank.

The work head now returns to operative position and the valve 36 (Fig. 2) is moved downwardly by the cams 37 and 38 putting the line 257 on exhaust. The spring 248 moves the lever 245 back to its original position and the pawl 228 takes its position in the bore of a new blank which has been fed forward in the guide 196 or 275, as the case may be, by the motion of the associated belt 177.

There are four pusher units comprising the pushers 226 and pawls 228 and the mechanism for actuating the same, and four chutes comprising the castings 201 and 210 and the sheet-metal part 215. The pusher units and castings are all identical in construction and operation. There is one chute and one pusher unit and pusher-unit operating mechanism for each work head of the machine. Two of the work heads are supplied from one of the belts 177 and the other pair of work heads from the other belt 177. The guide arrangements associated with each belt are identical. In Figure 1, three of the work heads are shown in cutting position and the lower ends of the corresponding chute 215 are accordingly out of alignment with the passageways 220 in these heads. The fourth work head is shown in loading position with the associated chute 215 in register with the passageway 220 of that head.

Where the selector used in Figures 22 and 23 is used, the blanks are carried by each conveyor past the stripper finger 112 and the stripper block 130 into the casting 300. Blanks that are right side up drop through the throat formed at the juncture of the passages 301 and 302 and pass on in correct position to the belt 177. Blanks that are inverted strike the throat plate 306, rock on the edge of this plate, are turned over and pass through the passage 302 onto the belt 177 right side up. The movement of the blanks after they leave the selectors 300 is the same as the movement of the blanks after they leave the castings 175 (Fig. 14) in the first described embodiment of our invention.

While the invention has been described as embodied in a mechanism for feeding bevel gear blanks, it is to be understood it is not restricted to this use, as, by suitable modification, it may be employed for feeding other types of blanks, also. It will be understood, moreover, that while the invention has been described in use with a four-spindle machine of a particular type, it is not restricted to this particular use, but that various features of the invention may be employed jointly or singly on other types of gear cutting machines also. In general, it may be said that this application is intended to cover any variations, uses, or adaptations of the invention following, in general, the principles of the invention and including such departures from the present disclosure as come within known or customary practice in the art to which it pertains and as may be applied to the essential features hereinbefore set forth and as fall within the scope of the invention or the limits of the appended claims.

Having thus described our invention, what we claim is:

1. In a mechanism for feeding to a machine gear blanks which have unlike side faces, a hopper adapted to hold a plurality of gear blanks, means for conveying blanks from the hopper to the machine, a pair of stationary deflector bars extendng one on either side of said conveying means and having surfaces diverging outwardly from the conveying means and positioned with reference to said conveying means that at their entering ends they will engage an inverted blank but allow a correctly positioned blank to pass.

2. In a mechanism for feeding to a machine gear blanks which have unlike side faces, a hopper adapted to hold a plurality of gear blanks, means for conveying blanks from the hopper to the machine, a pair of stationary deflector bars extending one on either side of said conveying means and having surfaces converging in the direction of movement of the blanks and diverging outwardly from the conveying means, said bars being so positioned with reference to the conveying means that at their entering ends they will engage an inverted blank but allow a correctly positioned blank to pass.

3. In a mechanism for feeding to a machine gear blanks which have unlike side faces, a hopper adapted to hold a plurality of gear blanks, means for agitating the blanks in the hopper, an elevator chain mounted so that for a portion of its length it travels through the mass of blanks in the hopper and having pockets thereon adapted to carry single blanks, means for driving said chain to carry the blanks from the hopper to the machine, means for stripping excess blanks from the pockets of the chain as it passes out of the hopper, and a stationary selector mounted in the path of travel of the chain and outside said hopper and beyond said stripping means and adapted to allow only correctly positioned blanks to pass on to the chucking mechanism.

4. In a machine of the class described, a plurality of work heads, chucking mechanism for each work head, a hopper adapted to hold a plurality of gear blanks and means for conveying blanks from the hopper to the several work heads comprising a main conveyor, individual conveyors for each head arranged at a side of the main conveyor, a guide member arranged ahead of each individual conveyor to deflect blanks to one side of said main conveyor, and a guide member associated with each individual conveyor and extending over that part of the main conveyor onto which the first-named guide members deflect the blanks whereby to guide blanks from said main conveyor onto the individual conveyors, each of the second-named guide members being spaced from the associated first guide member whereby an excess of blanks at any of the second-named guide members, is deflected away from the second-named guide member to the other side of the main conveyor.

5. In a machine of the class described, a work head, a hopper adapted to hold a plurality of gear blanks, a pocket adapted to hold single gear blanks, loading mechanism adapted to take blanks from the pocket and chuck them on the head, a main conveyor adapted to carry blanks from the hopper, an auxiliary conveyor adapted to carry blanks from the main conveyor to said pocket, a reciprocating pusher adapted to be actuated on movement of the work head to loading position, and a pawl pivotally mounted on said pusher adapted to engage in the bore of a gear blank when the pusher is actuated to push a blank from the main conveyor into the auxiliary conveyor.

6. In a machine of the class described, a work head, a hopper adapted to hold a plurality of gear blanks, a pocket adapted to hold a single gear blank, an automatic loading mechanism adapted to take blanks from the pocket and chuck them on the work head, a main conveyor adapted to carry blanks from the hopper, an auxiliary conveyor adapted to carry blanks from the main conveyor to said pocket, a reciprocatory pusher adapted to be actuated to push blanks from the main conveyor into the auxiliary conveyor, fluid-pressure operated means for actuating said pusher, and a valve controlling said last named mechanism adapted to be opened on movement of the work head to loading position to permit actuation of said pusher.

7. In a machine of the class described, a work head, tool mechanism, means for moving the work head from loading position to bring a work piece mounted thereon into operative relation with the tool mechanism and for moving the work head back to loading position after operations on the work-piece have been completed, a hopper adapted to contain a plurality of gear blanks, a pocket mounted on the work head and adapted to hold a single gear blank, automatic loading mechanism mounted on the work head for transferring blanks automatically from the pocket to the work head, a conveyor for carrying blanks from the hopper to the pocket in the work head, said conveyor being arranged so that when the work head is at loading position said conveyor registers with the pocket but when the work head is in cutting position, the pocket is out of registry with said conveyor, and means operative on movement of the work head to loading position to cause a blank to be transferred from the conveyor to the pocket.

8. In a machine of the class described, a tool mechanism, a work head movable to and from the tool mechanism, a work spindle journaled therein, a hopper adapted to contain a plurality of gear blanks, a pocket on the work head adapted to hold a single gear blank, loading mechanism for transferring blanks successively from the pocket to the work spindle and loading them thereon, a main conveyor for carrying blanks from the hopper and an auxiliary conveyor at one side of the main conveyor and adapted to convey blanks to the pocket, said auxiliary conveyor being stationary and registering with the pocket in the work head only when the work head is at loading position, a right angular guide member adapted to direct blanks from the main conveyor to one side thereof into line with the auxiliary conveyor, and a pusher member operable when the work head is moved to loading position to push a blank from said guide into the auxiliary conveyor to be delivered to the pocket.

9. In a machine of the class described in which four work heads are disposed in spaced relation about a single rotary milling cutter, chucking mechanism for each head, means for moving the several work heads toward the rotary cutter to bring the work-pieces mounted thereon into operative relation with the cutter and for withdrawing the heads to loading position after the operations on each work-piece have been completed, a pair of hoppers, each of which is adapted to hold a plurality of gear blanks, a pair of main conveyors arranged one on either side of the machine and adapted to carry blanks from the separate hoppers, individual conveyors leading from one main conveyor to the loading mechanisms of the two heads at one side of the machine, individual conveyors leading from the other main conveyor to the two loading mechanisms of the heads at the opposite side of the machine, and means for operating the separate loading mechanisms when each head is moved to loading position.

10. In mechanism for feeding to a machine gear blanks which have unlike side faces, a selector comprising a member formed with an angular passageway having a bottom along which blanks slide which is shaped to conform to the shape of one side face of the blank, one part of which passageway is inclined to the horizontal and serves as an entering end and the other part of which is also inclined to the horizontal and serves as a leaving end, a block secured in one side of the passageway at the juncture of the two parts thereof and having a concave face fronting said passage-way, and a place secured at one side of said passage-way beneath said block and projecting beyond the block into the throat formed after the juncture of the two parts of the passageway, said plate providing a fulcrum for turning over blanks that enter the passageway in inverted position whereby blanks leaving the passageway will all have the correct side up.

H. J. WHITE.
W. J. CHARLES.